United States Patent
Cheng et al.

(10) Patent No.: US 8,014,593 B2
(45) Date of Patent: Sep. 6, 2011

(54) IMAGE COLOR COMPENSATING APPARATUS AND METHODS THEREOF

(75) Inventors: Chun-Ming Cheng, Taipei County (TW); Tsung-Hsiang Huang, Changhua County (TW)

(73) Assignee: Princeton Technology Corporation, Taipei County (TW)

( * ) Notice: Subject to any disclaimer, the term of this patent is extended or adjusted under 35 U.S.C. 154(b) by 890 days.

(21) Appl. No.: 12/010,070

(22) Filed: Jan. 18, 2008

(65) Prior Publication Data

US 2008/0298675 A1    Dec. 4, 2008

(30) Foreign Application Priority Data

May 30, 2007    (TW) .............................. 96119307 A

(51) Int. Cl.
*G06K 9/00*    (2006.01)

(52) U.S. Cl. .......................... 382/162; 382/118; 382/167

(58) Field of Classification Search .................. 382/162, 382/167, 118; 358/1.9, 518; 349/117, 96; 347/11; 353/20
See application file for complete search history.

(56) References Cited

U.S. PATENT DOCUMENTS

| 7,264,323 B2 * | 9/2007 | Tainer et al. ..................... 347/11 |
| 7,577,293 B2 * | 8/2009 | Chien ............................ 382/167 |

* cited by examiner

*Primary Examiner* — Anh Hong Do
(74) *Attorney, Agent, or Firm* — Muncy, Geissler, Olds & Lowe, PLLC

(57) ABSTRACT

The invention relates to an image color compensating apparatus and related method thereof. A color space conversion operation is implemented in a pixel of a source image to convert first image signals corresponding to the pixel to second image signals corresponding to a color space plane. The color space plane comprises a color compensation region. Mathematical operations are implemented in the second image signals to determine where the pixel is located. When the pixel resides in the color compensation region, a compensation operation is implemented in the second image signals. Thus, the pixel approaches a predetermined direction for adjusting the color of the pixel.

16 Claims, 3 Drawing Sheets

IMAGE COLOR COMPENSATING APPARATUS AND METHODS THEREOF

BACKGROUND OF THE INVENTION

1. Field of the Invention

The invention relates to an image color processing method, and more particularly to an image color compensating apparatus and related method.

2. Description of the Related Art

From the earliest cold cathode fluorescent lamp (CCFL) displays to the liquid crystal displays (LCD) that has become more popular in the recent years, displays have always been an essential component for information communication. The applications of CCFL displays are already well developed. CCFL displays provide rich colors, especially when applied in televisions and personal computers. However, when considering smaller sizes and lighter weights, CCFL displays are not suitable to be applied in today's personal computers and personal digital assistants (PDA). Thus, LCDs have replaced traditional CCFL displays for applications requiring smaller sizes and lighter weights.

The conventional method for recording color attributes of a digital image, for example, color attributes of pixels in a color axis such as RGB, YUV, YCbCr, or YPbPr, can not be easily applied in the practical application for adjusting color attribute according to a displayed color of the pixels. Namely, when a user adjusts color saturation or luminance of a displayed image, color saturation or luminance of the pixels of the displayed image are increased or decreased at the same time. For human vision however, displayed image preferences can not be satisfied by just increasing or decreasing color saturation or luminance of the pixels of the displayed image. For example, user A may prefer more saturated red coloring and less saturated green coloring, while user B may prefer less saturated red coloring and more saturated blue coloring. Thus, displayed image preferences of users are not satisfied by just increasing or decreasing color saturation or luminance of the pixels of the displayed image.

A color compensating method is provided for adjusting the color of the image according to user preference.

BRIEF SUMMARY OF THE INVENTION

According to one exemplary embodiment of the invention, an image color compensation method comprises: performing a color space conversion operation on a pixel of a source image to convert a plurality of first image signals of the pixel to a plurality of second image signals corresponding to a color space plane, wherein the color space plane comprises a color compensation region; performing a plurality of mathematical and logical operations on the second image signals to determine a location of the pixel in the color space plane; and performing a compensation operation on the second image signals to make the pixel approach a predetermined direction in the color space plane so as to adjust the color of the pixel when the pixel resides in the color compensation region.

According to another exemplary embodiment of the invention, an image color compensation apparatus comprises a color space conversion unit and an image color compensation unit. The color space conversion unit performs a color space conversion operation on a pixel of a source image to convert a plurality of first image signals of the pixel to a plurality of second image signals corresponding to a color space plane, wherein the color space plane comprises a color compensation region. The image color compensation unit coupled to the color space conversion unit performs a plurality of mathematical and logical operations on the second image signals to determine a location of the pixel in the color space plane, and performs a compensation operation on the second image signals to make the pixel approach a predetermined direction in the color space plane so as to adjust the color of the pixel when the pixel resides in the color compensation region.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
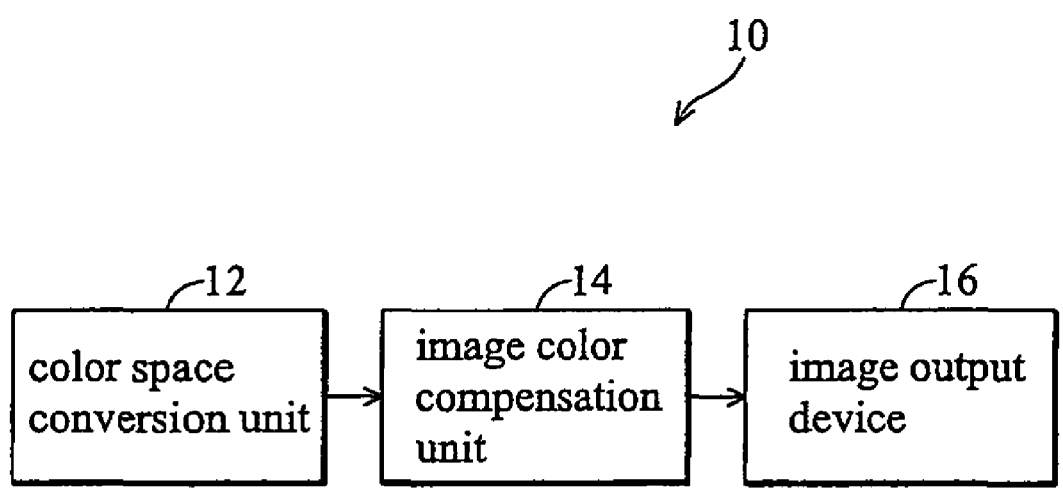
FIG. 1 illustrates a block diagram of the image color compensation apparatus according to one embodiment of the invention.
Figure 2:
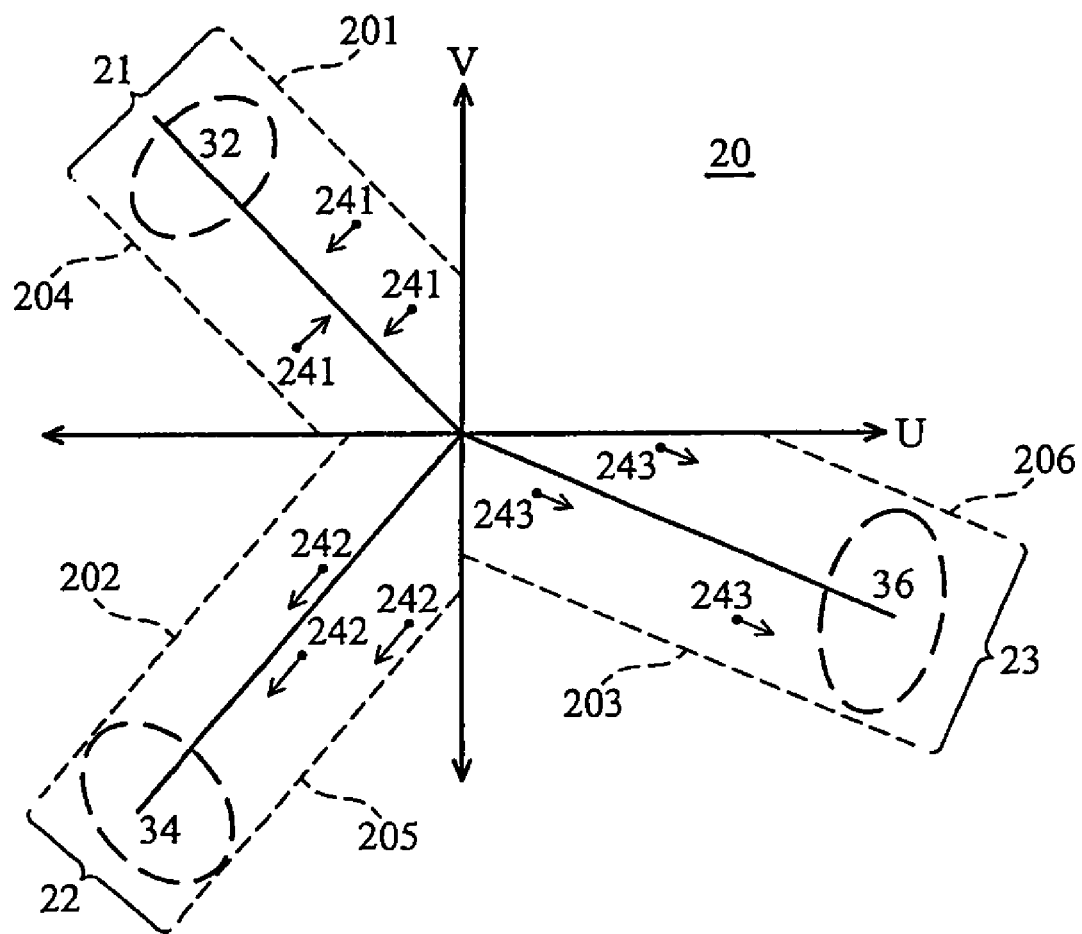
FIG. 2 illustrates a YUV color space plane for compensating image color.

Please refer to FIGS. 1 and 2. FIG. 1 illustrates a block diagram of the image color compensation apparatus according to one embodiment of the invention. FIG. 2 illustrates a YUV color space plane for image color compensation. As shown in FIGS. 1 and 2, image color compensation apparatus 10 comprises a color space conversion unit 12 and an image color compensation unit 14. Color space conversion unit 12 performs a color space conversion operation on pixels 241-243 of a source image to convert first image signals of the pixels 241-243 to second image signals corresponding to color space plane 20, wherein the color space plane 20 comprises color compensation regions 21-23. Image color compensation unit 14 is coupled to the color space conversion unit 12. Image color compensation unit 14 performs a plurality of mathematical and logical operations on the second image signals to determine the location of the pixels 241-243 in the color space plane, and performs a compensation operation on the second image signals to make the pixels 241-243 approach a predetermined direction in the color space plane so as to adjust the color of the pixels 241-243 when the pixels 241-243 reside in the color compensation regions 21-23. The predetermined directions are the directions approaching the locations of a skin color, a green color and a blue color in the color space plane 20, which are also shown as the directions of arrows in FIG. 2.

The color space conversion unit 12 forms the color compensation regions 21-23 according to first axes 201-203 and second axes 204-206. The image color compensation unit 14 performs the mathematical and logical operations on the second image signals to determine the location of the pixels 241-243 in the color space plane 20, and performs the compensation operation on the second image signals to adjust the color of the pixels 241-243 when the pixels 241-243 reside in the color compensation regions 21-23.

In one embodiment of the invention, the image color compensation unit 14 further determines whether the pixels 241-243 residing in the color compensation regions 21-23 are over compensated, adjusts pixel values of the pixels 241-243 when the pixels 241-243 are over compensated, and image output device 16 outputs a final image. Otherwise, image output device 16 outputs the pixels 241-243 directly to generate the final image.

The color space conversion operation unit 12 converts the first image signals of the pixels 241-243 to YUV image signals corresponding to the color space plane 20. In another embodiment, the color space conversion operation unit 12 converts the RGB image signals of the pixels 241-243 to YUV image signals corresponding to the color space plane 20.

In one embodiment of the invention, the color compensation region 21 comprises a skin tone 32, and when the image color compensation unit 14 performs the compensation operation on the second image signals, the pixel 241 is made to approach the skin tone 32 so as to adjust a skin color of the pixel 241 to be close to a preset skin color.

In another embodiment of the invention, the color compensation region 22 comprises a green tone 34, and when the image color compensation unit 14 performs the compensation operation on the second image signals, the pixel 242 is made to approach the green tone 34 so as to adjust a green color of the pixel 242 to be close to a preset green color.

In yet another embodiment of the invention, the color compensation region 23 comprises a blue tone 36, and when the image color compensation unit 14 performs the compensation operation on the second image signals, the pixel 243 is made to approach the blue tone 36 so as to adjust a blue color of the pixel 243 to be close to a preset blue color.

The above embodiments illustrate three kinds of color adjusting methods for three different colors, wherein the adjusting concepts are the same and the only difference in the three embodiments is that the color compensation regions 21-23 are located in different dimensions of the YUV color space plane. Thus, the image color compensation apparatus 10 can adjust three colors according to user preferences, for example, the image color compensation apparatus 10 can only adjust one of the three colors in sequence, or adjust two or three colors at the same time.

Figure 3:
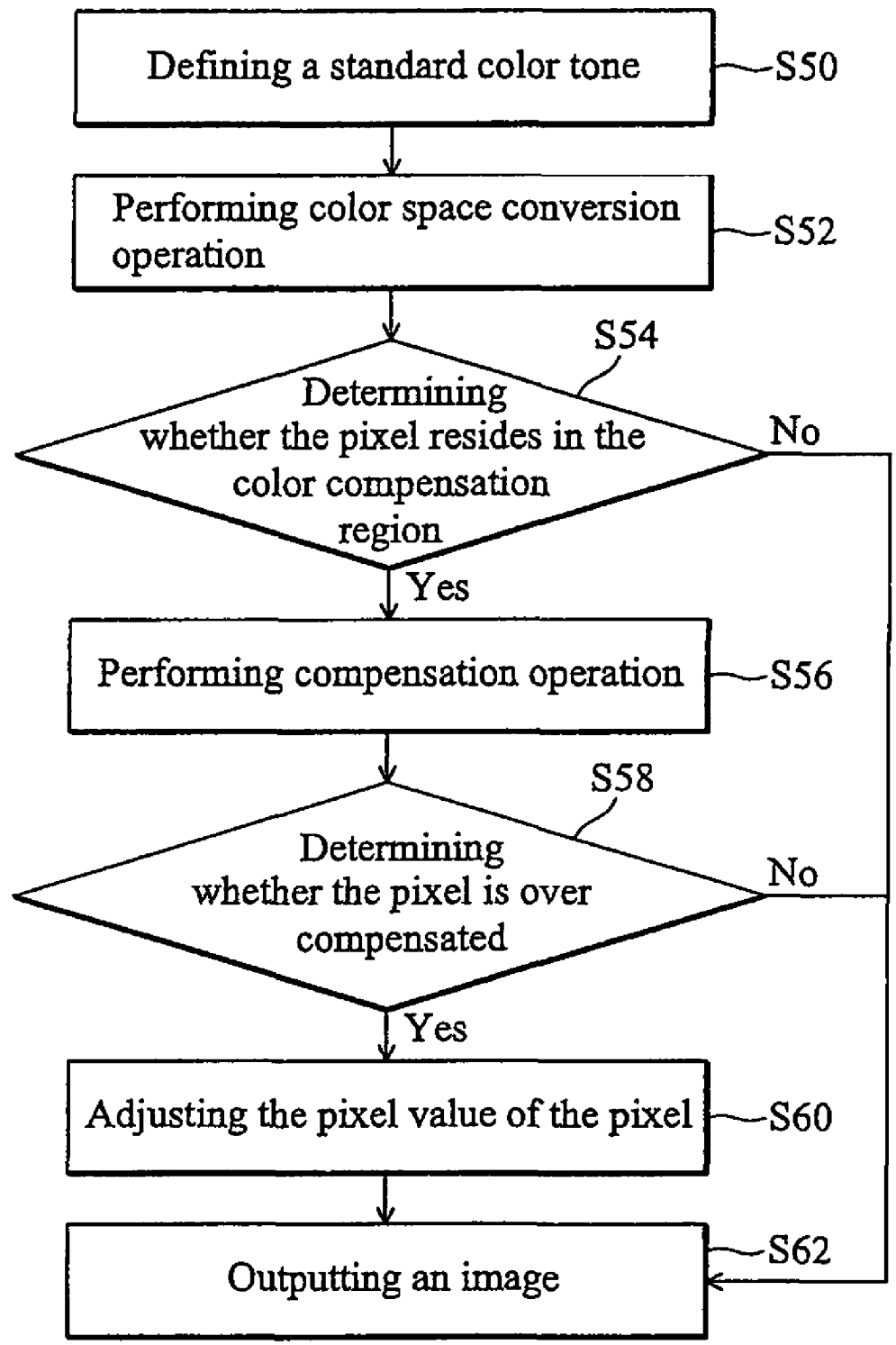
FIG. 3 illustrates a flow chart of the image color compensation method according to one embodiment of the invention.

Please refer to FIG. 3. FIG. 3 illustrates a flow chart of the image color compensation method according to one embodiment of the invention. The image color compensation method comprises:

S50: Standard tones are defined;

S52: Color space conversion operation are performed on the pixel of a source image to convert first image signals of the pixel to second image signals corresponding to a color space plane, wherein the color space plane comprises a color compensation region, and the color space plane is formed according to a first axis and a second axis;

S54: Mathematical and logical operations are performed on the second image signals to determine the location of the pixel in the color space plane;

S56: The compensation operation is preformed on the second image signals to make the pixel approach a predetermined direction in the color space plane so as to adjust the color of the pixel when the pixel resides in the color compensation region. When the pixel does not reside in the color compensation region, the pixel is outputted directly to generate an image without compensation operation (S62). The predetermined directions is selected from a group comprising the directions approaching the locations of a skin color, a green color and a blue color in the color space plane, respectively.

S58: It is determined whether the pixel residing in the color compensation region is over compensated; and S60: Pixel value of the pixel is adjusted and an image is obtained when the pixel is over compensated; otherwise the pixel is outputted directly to generate an image (S62). In one embodiment, a range of pixel values, for example, pixel values within −128~127 to be compensated, can be pre-selected at the beginning of the compensation operation. Thus, pixel value of the pixel is adjusted in S60 to satisfy the pre-selected range of pixel values −128~127 when the over compensation due to the compensation operation in S56 is detected in S58. For example, when the pixel value exceeds 127 after compensation operation in S56, the pixel value is adjusted to 127.

S62: The output image is generated.

The color space conversion operation is performed to convert the first image signals of the pixels to YUV image signals corresponding to the color space plane. In another embodiment, the color space conversion operation is performed to convert the RGB image signals of the pixels to YUV image signals corresponding to the color space plane.

In one embodiment of the invention, the color compensation region comprises a skin tone, and when the image color compensation operation is performed on the second image signals, the pixel is made to approach the skin tone so as to adjust a skin color of the pixel to be close to a preset skin color.

In another embodiment of the invention, the color compensation region comprises a green tone, and when the image color compensation operation is performed on the second image signals, the pixel is made to approach the green tone so as to adjust a green color of the pixel to be close to a preset green color.

In yet another embodiment of the invention, the color compensation region comprises a blue tone, and when the image color compensation operation is performed on the second image signals, the pixel is made to approach the blue tone so as to adjust a blue color of the pixel to be close to a preset blue color.

The color compensation region, skin tone, green tone, and blue tone illustrated above can be set according to different applications. For example, the color compensation region can be adjusted by users to select the part of the pixel in the color space plane to be compensated. The three color tones can also be set according to the preferences of different users. After setting the three color tones, the pixel value of the pixel residing in the color compensation region is adjusted according to the set skin tone, green tone, and blue tone. In this way, efficient image color adjustment can be achieved and the image preferences required by different user are also fulfilled.

The image color compensation method and apparatus are not limited in adjusting skin tone, green tone, and blue tones as described above. Any image color compensation utilizing the described image color compensation method is still within the scope of this invention.

From the above description, image color compensation method and apparatus are provided according to the embodiments of the invention. The pixel value of the pixel residing in the preset color compensation region is color compensated and made to approach a desired skin tone, green tone, and blue tone according to user preferences. Thus, the color of the compensated pixel can approach the set skin, green and blue color. In this way, efficient image quality improvement can be achieved and the image color is adjusted according to the user preferences.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image color compensation method, comprising:
performing a color space conversion operation, by way of a color space conversion unit, on a pixel of a source image to convert a plurality of first image signals of the pixel to a plurality of second image signals corresponding to a color space plane, wherein the color space plane comprises a color compensation region;
performing a plurality of mathematical and logical operations, by way of an image color compensation unit coupled to the color space conversion unit, on the second image signals to determine a location of the pixel in the color space plane;
performing a compensation operation, by way of the image color compensation unit, on the second image signals to make the pixel approach a predetermined direction in the color space plane so as to adjust the color of the pixel when the pixel resides in the color compensation region;
wherein the image color compensation unit determines whether the pixel residing in the color compensation region is over compensated, and adjusts a pixel value of the pixel when the pixel is over compensated and obtains a final image, otherwise, the image color compensation unit outputs the pixel directly to generate the final image.

2. The image color compensation method as claimed in claim 1, further comprising:
forming the color compensation region according to a first axis and a second axis;
performing the mathematical and logical operations on the second image signals to determine the location of the pixel in the color space plane; and
performing the compensation operation on the second image signals to adjust the color of the pixel when the pixel resides in the color compensation region.

3. The image color compensation method as claimed in claim 1, wherein the predetermined direction is selected from a group comprising the directions approaching the locations of a skin color, a green color and a blue color in the color space plane, respectively.

4. The image color compensation method as claimed in claim 1, wherein the color space conversion operation further comprises converting the first image signals of the pixel to a plurality of YUV image signals corresponding to the color space plane.

5. The image color compensation method as claimed in claim 4, wherein the color space conversion operation further comprises converting a plurality of RGB image signals of the pixel to a plurality of YUV image signals corresponding to the color space plane.

6. The image color compensation method as claimed in claim 1, wherein the color compensation region further comprises a skin tone, and the pixel is made to approach the skin tone so as to adjust a skin color of the pixel to be close to a preset skin color when performing the compensation operation on the second image signals.

7. The image color compensation method as claimed in claim 1, wherein the color compensation region further comprises a green tone, and the pixel is made to approach the green tone so as to adjust a green color of the pixel to be close to a preset green color when performing the compensation operation on the second image signals.

8. The image color compensation method as claimed in claim 1, wherein the color compensation region further comprises a blue tone, and the pixel is made to approach the blue tone so as to adjust a blue color of the pixel to be close to a preset blue color when performing the compensation operation on the second image signals.

9. An image color compensation apparatus, comprising:
a color space conversion unit, performing a color space conversion operation on a pixel of a source image to convert a plurality of first image signals of the pixel to a plurality of second image signals corresponding to a color space plane, wherein the color space plane comprises a color compensation region;
an image color compensation unit coupled to the color space conversion unit, the image color compensation unit performing a plurality of mathematical and logical operations on the second image signals to determine a location of the pixel in the color space plane, and performing a compensation operation on the second image signals to make the pixel approach a predetermined direction in the color space plane so as to adjust the color of the pixel when the pixel resides in the color compensation region;
wherein the image color compensation unit determines whether the pixel residing in the color compensation region is over compensated, and adjusts a pixel value of the pixel when the pixel is over compensated and obtains a final image, otherwise, the image color compensation unit outputs the pixel directly to generate the final image.

10. The image color compensation apparatus as claimed in claim 9, wherein the color space conversion unit forms the color compensation region according to a first axis and a second axis, and the image color compensation unit performs the mathematical and logical operations on the second image signals to determine the location of the pixel in the color space plane and performs the compensation operation on the second image signals to adjust the color of the pixel when the pixel resides in the color compensation region.

11. The image color compensation apparatus as claimed in claim 9, wherein the predetermined direction is selected from a group comprising the directions approaching the locations of a skin color, a green color and a blue color in the color space plane, respectively.

12. The image color compensation apparatus as claimed in claim 9, wherein the color space conversion operation further comprises converting the first image signals of the pixel to a plurality of YUV image signals corresponding to the color space plane.

13. The image color compensation apparatus as claimed in claim 9, wherein the color space conversion operation further comprises converting a plurality of RGB image signals of the pixel to a plurality of YUV image signals corresponding to the color space plane.

14. The image color compensation apparatus as claimed in claim 9, wherein the color compensation region further comprises a skin tone, and the pixel is made to approach the skin tone so as to adjust a skin color of the pixel to be close to a preset skin color when performing the compensation operation on the second image signals.

15. The image color compensation apparatus as claimed in claim 9, wherein the color compensation region further comprises a green tone, and the pixel is made to approach the green tone so as to adjust a green color of the pixel to be close to a preset green color when performing the compensation operation on the second image signals.

16. The image color compensation apparatus as claimed in claim 9, wherein the color compensation region further comprises a blue tone, and the pixel is made to approach the blue tone so as to adjust a blue color of the pixel to be close to a preset blue color when performing the compensation operation on the second image signals.

* * * * *